Nov. 26, 1968  E. FITZER ET AL  3,413,147
METHOD OF PROTECTIVELY TREATING AN ELECTRICALLY AND THERMALLY
CONDUCTING REFRACTORY BODY OF SINTERED SILICON CARBIDE
Filed Aug. 5, 1964
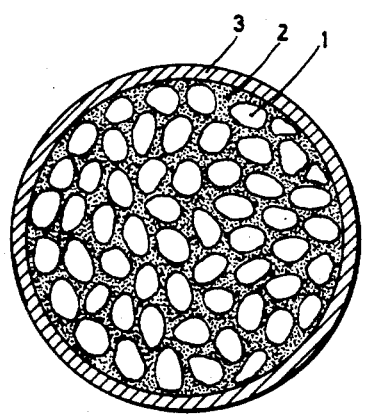

the body. If desired, but not necessarily, known adhesion agents may be added to the fixing agent, such as vinyl acetate, vinyl alcohol, dextrin, nitrocellulose or the like.

3,413,147
METHOD OF PROTECTIVELY TREATING AN ELECTRICALLY AND THERMALLY CONDUCTING REFRACTORY BODY OF SINTERED SILICON CARBIDE

Erich Fitzer, Karlsruhe, Germany, Theodor Chvatal, Vienna, Austria, and Erich Buchner, Erlangen, and Ottmar Rubisch, Meitingen, Germany, assignors to Siemens-Planiawerke Aktiengesellschaft fur Kohlefabrikate, Meitingen uber Augsburg, Germany, a corporation of Germany
Filed Aug. 5, 1964, Ser. No. 388,351
6 Claims. (Cl. 117—215)

ABSTRACT OF THE DISCLOSURE

In accordance with this invention, electrical heating elements consisting of sintered bodies of silicon carbide are subjected to surface treatment with phosphoric acid. One way of performing the method is to impregnate the sintered body with phosphoric acid, particularly in high percentile concentration. For fixing the phosphoric acid, the sintered body of silicon carbide, after impregnation with phosphoric acid, is preferably coated with a fixing agent. Suitable as fixing agents, for example, are pigments, suspensions or gel solutions which are brushed or otherwise spread upon the body, or with which the body is impregnated.

---

Our invention relates to a protective treatment of electrically and thermally conducting refractory bodies of sintered silicon carbide.

Sintered bodies of silicon carbide are employed for various purposes, for example as electric heating elements in the shape of elongated heater rods or loop-shaped heaters. When in operation, or during preparatory work such as the installation of such sintered silicon carbide bodies, they often suffer a modification in essential electrical properties. Such changes are manifested particularly by an increase in electrical resistance with the effect of shortening the useful lifetime.

It is an object of our invention to prevent or greatly minimize such detriments.

To this end, and in accordance with our invention, we subject the sintered bodies of silicon carbide to surface treatment with phosphoric acid. Such a protective treatment can be performed in a very simple manner, yet has been found extremely effective.

The drawing shows schematically in cross section a sintered silicon carbide rod produced by the method according to the invention, namely according to the below described example B1 or B2.

The heating conductor illustrated consists of silicon carbide granules 1 and possesses some porosity. The pores are impregnated with phosphoric acid 2. The heating conductor is enclosed by a coating 3 of phosphoric acid and argillaceous earth.

One way of performing the method is to impregnate the sintered body with phosphoric acid, particularly in high percentile concentration.

For fixing the phosphoric acid, and in accordance with another feature of our invention, the sintered body of silicon carbide, after impregnation with phosphoric acid, is preferably coated with a fixing agent. Suitable as fixing agents, for example, are pigments, suspensions or gel solutions which are brushed or otherwise spread upon the body, or with which the body is impregnated. Preferably employed are silicic acid, particularly colloidal silica gel, silicic acid esters such as methyl orthosilicates, aluminum silicate, zirconium silicate or oxide water suspensions such as in form of sludges. All of these fixing agents can be spread upon the body or applied by impregnating the body. If desired, but not necessarily, known adhesion agents may be added to the fixing agent, such as vinyl acetate, vinyl alcohol, dextrin, nitrocellulose or the like.

We have found, however, that if the fixing agents are not properly applied to the sintered body of silicon carbide, the desired protection can be inadvertently nullified. Thus, for example, after impregnating a silicon carbide sintered body with phosphoric acid and coating it by spreading thereupon a 50% aqueous solution of argillaceous earth gel, the porous body was completely destroyed after being annealed for five hours at 1400° C. According to another feature of the invention, therefore, we employ only fixing agents which do not vigorously attract the phosphoric acid and do not bond it by chemical reactions at the surface. For example, we have found it particularly advantageous to employ as fixing agent an aluminum phosphate solution in the molar composition of phosphoric acid: $Al_2O_3=3:1$ in a 20% aqueous solution. The detrimental effect of the pure argillaceous earth solution as a fixing agent is also eliminated by spraying phosphoric acid in 85% concentration upon the still humid coating. Such combined coating layers of phosphoric acid and argillaceous earth harden at 100° C. in one hour.

Series of tests have shown that a multiple impregnation of sintered bodies with phosphoric acid, preferably of about 84 to 85% concentration, is particularly advantageous. A conjoint impregnation with silicic acid affords a further improvement, such impregnation being performed intermediate the phosphoric acid impregnations, or together therewith, or also before applying the phosphoric acid impregnations. Examples of such methods are the following:

EXAMPLE A1

The sintered body of silicon carbide is first impregnated with a silicate or a silicic acid ester and is then subjected to hydrolysis and dehydrating at 300 to 500° C. Thereafter the body is impregnated with phosphoric acid and then annealed at 1000° C. Thereafter the body is again impregnated with phosphoric acid and again annealed at 1000° C.

EXAMPLE A2

The following mode of applying the protective impregnation has been found advantageous:
Impregnating with silica gel,
Annealing at 400° C.,
Impregnating with phosphoric acid and subsequent annealing at 1000° C., thereafter impregnating with aqueous borax solution ($Na_2B_4O_7$) and ultimately annealing at 1000° C. in air.

EXAMPLE A3

The sintered body of silicon carbide is first impregnated with phosphoric acid and then annealed for one-half hour at 800 to 1000° C. in air. This is followed by impregnation or coating with a suspension consisting of kaolin or bentonite or another clay in aqueous phosphoric acid. After the last impregnation, the body is annealed at 500 to 600° C.

The method of the invention is also applicable for preventing or reducing the thermal aging of high-temperature resistant silicon carbide bodies, to which such bodies are subjected when heated in oxidizing atmospheres. Thermal aging is due to intercrystalline oxidation. To prevent it, the treatment according to the invention is performed by covering the sintered body with a protective coating consisting of phosphoric acid and a high melting oxide or silicate.

The oxide or silicate is preferably chosen from aluminum oxide or aluminum hydroxide and/or zirconium oxide and/or aluminum silicate and/or silica gel and/or ethyl silicate.

According to one embodiment of this method, the sintered bodies are first impregnated with phosphoric acid, then enveloped with a mass of oxide or silicate, and then heated until the mass adheres to the body.

According to another way of performing the method, the sintered bodies are impregnated with a mass of oxide or silicate, then enveloped by a mass of oxide or silicate mixed with phosphoric acid, and thereafter heated until the oxide or silicate mass adheres and the formation of phosphates takes place.

The impregnation of the sintered bodies is preferably effected prior to their oxidation.

EXAMPLE B1

Silicon carbide rods are placed into a cylindrical vacuum tank which is thereafter evacuated down to a pressure of 10 torr. Thereafter concentrated o-phosphoric acid (84.5%) is supplied into the tank until the rods are covered by the liquid. Then the tank is vented and the phosphoric acid drained.

The SiC rods, now fully impregnated with $H_3PO_4$ are coated by brushing with a 70% solution of argillaceous earth (bentonite) and then heated by directly passing electric current through the rods for two hours to a temperature of 1400 to 1500° C. The rods thus treated exhibit an only slight change in electric resistance within 2000 to 3000 hours of operation at 1400° C. in air.

EXAMPLE B2

Silicon carbide rods are impregnated three times in vacuum with a 50% solution of argillaceous earth gel and then dried at 300° C. The rods thus pretreated are sprayed with a suspension formed of 10% zirconium dioxide or zirconium silicate in phosphoric acid of 75% concentration. For drying, the rods are heated at 200° C. by passing electric current therethrough. Thereafter they are heated within four hours at 1200° C. After two hours of such heating, the impregnating substances, to the extent they constitute pure oxides, are completely converted to phosphates. Rods thus treated exhibited only 5 to 7% resistance increase after a few 1000 hours of operation at 1300 to 1400° C. in air.

The method according to the invention described above with reference to the treatment of heating elements of silicon carbide, can also be applied to other shaped bodies of silicon carbide, for example plates, blocks, crucibles and others which, like heater rods, do not involve an oxidic bonding but a carbide or silicide bond. Heretofore, large shaped bodies have been produced for silicon carbide bodies bonded by oxides and preferably silicates. While this is cheaper, it involves serious disadvantages, such as a reduced thermal and electrical conductivity, as well as a lower heat resistance. Such shaped bodies, for example, soften at 1350° C. and sag under their own weight if relatively long unsupported areas are involved.

By recrystallization or conversion of a carbon bond to a silicon carbide or nitride bond or into a metal silicide or metal nitride or carbide bond, the resulting shaped bodies of silicon carbide exhibit a much better conductivity and much higher mechanical strength. This method, however, is not only more expensive but also requires relatively high sintering temperatures. The method further requires a very dense packing and a good bonding of the granules. These properties can be achieved with economically permissible expenditures only if the production is limited to relatively small dimensions, such as the production of rods, tubes and the like. For that reason, relatively large shaped pieces which are free of oxidic or silicate bonds have been introduced industrially only to a limited extent.

By virtue of the method according to the invention, however, it has now become possible to economically employ silicon carbide bodies free of silicate bonds in cases where the packing of the granules is not very dense and the bonding bridges are only weak, because the oxidizing reduction of these bonding bridges is prevented or greatly retarded. For that reason, the invention also affords the production of relatively large shaped bodies of silicon carbide under less stringent conditions than had to be heretofore observed.

We claim:

1. The method of protectively treating an electrically and thermally conducting refractory body of sintered silicon carbide, which comprises impregnating the sintered silicon carbide body with concentrated phosphoric acid and thereafter coating the silicon carbide body with aluminum oxide in a phosphoric acid solution.

2. The method of protectively treating an electrically and thermally conducting refractory body of sintered silicon carbide, which comprises impregnating the sintered silicon carbide body with phosphoric acid, coating the body with a layer formed of phosphoric acid and a substance selected from the group consisting of aluminum oxide, aluminum silicate, zirconium oxide, zirconium silicate, silica gel, ethyl silicate, aluminum hydroxide, kaolin and bentonite, and heating the coated body until the coating firmly adheres thereto, whereby thermal aging of the body in oxidizing atmospheres is reduced.

3. The method according to claim 2, wherein said substance in said coating consists of aluminum oxide.

4. The method according to claim 2, wherein said substance in said coating consists of aluminum hydroxide.

5. The method according to claim 2, wherein said substance in said coating consists of zirconium silicate.

6. The method of protectively treating an electrically and thermally conducting refractory body of sintered silicon carbide, which comprises impregnating the body with a substance selected from the group consisting of aluminum oxide, aluminum silicate, zirconium oxide, zirconium silicate, silica gel, ethyl silicate, aluminum hydroxide, kaolin and bentonite, then enveloping the body with a mixture of phosphoric acid and a substance from said group, and thereafter heating the body until the substance firmly adheres thereto and formation of phosphates takes place.

References Cited

UNITED STATES PATENTS

| | | | |
|---|---|---|---|
| 1,742,259 | 1/1930 | Kelleher | 232—208 |
| 2,206,792 | 7/1940 | Stalhane | 252—516 |
| 2,383,653 | 8/1945 | Kirk | 117—169 |
| 2,521,839 | 9/1950 | Feagin | 117—123 X |
| 2,685,539 | 8/1954 | Woodburn et al. | 117 |
| 2,805,174 | 9/1957 | Veale | 117—123 X |
| 2,943,008 | 6/1960 | Saunders | 117—169 |
| 3,041,205 | 6/1962 | Iler | 117—169 X |
| 3,059,046 | 10/1962 | Westervelt et al. | 117—169 |
| 2,589,157 | 3/1952 | Stahlane | 252—516 |
| 2,735,881 | 2/1956 | Mann | 338—262 |

FOREIGN PATENTS

| | | |
|---|---|---|
| 1,303,260 | 7/1962 | France. |
| 14,363 | 1/1963 | Japan. |

OTHER REFERENCES

H. H. Greger, Brick and Clay Record 117, No. 2, 63, 68 (1950).

H. D. Sheets, J. J. Bulloff, and W. H. Duckworth, Brick and Clay Record 131, No. 1, 55–57 (1958).

ALFRED L. LEAVITT, *Primary Examiner.*

C. K. WEIFFENBACH, *Assistant Examiner.*